United States Patent
Abusleme et al.

(10) Patent No.: US 6,706,803 B1
(45) Date of Patent: Mar. 16, 2004

(54) SYNTHESIS OF PERHALOGENATED THERMOPLASTIC (CO)POLYMERS OF CHLOROTRIFLUOROETHYLENE

(75) Inventors: Julio A. Abusleme, Varese (IT); Claudia Manzoni, Bologna (IT)

(73) Assignee: Ausimont S.p.A., Milan (IT)

(*) Notice: Subject to any disclaimer, the term of this patent is extended or adjusted under 35 U.S.C. 154(b) by 0 days.

(21) Appl. No.: 09/612,286

(22) Filed: Jul. 7, 2000

(30) Foreign Application Priority Data

Jul. 9, 1999 (IT) .......................................... MI99A1516

(51) Int. Cl.[7] .......................... C08L 27/12; C08L 27/04
(52) U.S. Cl. ...................... 524/544; 524/457; 524/567; 524/805
(58) Field of Search ................................ 524/457, 206, 524/801, 805, 795, 544, 567

(56) References Cited

U.S. PATENT DOCUMENTS

| 4,577,044 A | * | 3/1986 | Campbell et al. | |
| 5,498,680 A | * | 3/1996 | Abusleme et al. | 526/209 |
| 5,672,667 A | * | 9/1997 | DeSimone et al. | 526/89 |
| 5,677,366 A | * | 10/1997 | Wu | 523/201 |
| 6,046,271 A | * | 4/2000 | Wu et al. | 524/742 |
| 6,096,795 A | * | 8/2000 | Abusleme et al. | 522/33 |

FOREIGN PATENT DOCUMENTS

EP  0 816 379 A1  1/1998

* cited by examiner

*Primary Examiner*—Callie Shosho
(74) *Attorney, Agent, or Firm*—Arent Fox Kintner Plotkin & Kahn PLLC

(57) ABSTRACT

A process for the synthesis of chlorotrifluoroethylene (PCTFE) (co)polymers, containing at least 80% by moles of CTFE, being the complement to 100 one or more fluorinated monomers, preferably the complement to 100 is formed of one or more perfluorinated monomers, characterized in that the reaction medium comprises (per)fluoropolyoxyalkylene microemulsions wherein the fluorinated surfactant is salified with sodium and/or potassium and an inorganic potassium and/or sodium initiator.

5 Claims, No Drawings

SYNTHESIS OF PERHALOGENATED THERMOPLASTIC (CO)POLYMERS OF CHLOROTRIFLUOROETHYLENE

The present invention relates to a process for obtaining halogenated polymers having good thermal stability.

Specifically the present invention relates to a process for obtaining chlorotrifluoroethylene (CTFE) polymers having substantially no discoloration, combined with a good thermal stability.

The chlorotrifluoroethylene (PCTFE) polymers according to the process of the present invention contain at least 80% by moles of CTFE and the complement to 100 being one or more fluorinated monomers, preferably the complement to 100 is formed of one or more perfluorinated monomers.

The polymers obtained in the process of the invention are to be used for manufacturing pipes, sheets, films and other articles having the advantages indicated below.

More specifically it is known in the prior art that the CTFE homopolymer is a fluorinated resin having excellent chemical resistance with good properties of impermeability to gases and vapours, more specifically to oxygen, nitrogen and water vapour, which make this resin the most suitable material for the extrusion in films for the pharmaceutical packaging industry.

For the above mentioned applications, it is desirable to use a PCTFE having good thermal stability and substantially no discoloration, allowing a wide processing window, i.e. high temperatures and long residence times in extrusion such that the PCTFE does not undergo discoloration without substantial weight loss. This wide processing window allows to obtain articles having complex shapes which require long residence times and high temperatures. In particular, the availaibility of a PCTFE with a wide processing window could allow the processing of polymers of high molecular weight and therefore to manufacture articles with improved mechanical properties from those PCTFE's of low molecular weight.

It is therefore desirable to have available an efficient industrial polymerization process, i.e. with yields not lower than about 10 g/(lxh) (g of polymer/l of water·h), thermodynamically stable latexes and absence of polymer buildup in the polymerization reactor, which allows the PCTFE synthesis of different viscosity values, in particular high molecular weight PCTFE's, having good thermal stability combined with substantial no discoloration.

The Applicant has unexpectedly and surprisingly found an efficient process for obtaining the above PCTFE's.

It is therefore an object of the present invention a process for the synthesis of chlorotrifluoroethylene (PCTFE) (co)polymers, containing at least 80% by moles of CTFE, being the complement to 100 one or more fluorinated monomers, preferably the complement to 100 is formed of one or more perfluorinated monomers, characterized in that the reaction medium comprises (per)fluoropolyoxyalkylene microemulsions wherein the fluorinated surfactant is salified with sodium and/or potassium and an inorganic potassium and/or sodium initiator.

The (per)fluoropolyoxyalkylene microemulsions according to the present invention are obtainable following the methods described in U.S. Pat. No. 4,864,006, in the name of the Applicant, herein incorporated by reference.

The fluorinated surfactants of the microemulsions according to the present invention are selected from the products of general formula

wherein $R_f$ is a $C_5$–$C_{14}$ (per)fluoroalkyl chain, or a (per)fluoropolyoxyalkylene chain, $X^-$ is —COO⁻ or —SO$_3^-$, $M^+$ is selected between Na⁺ and K⁺, preferably K⁺.

According to the present invention, potassium inorganic initiators are preferred, potassium persulphate is still more preferred.

The process of the invention is carried out at a temperature betwen 0° C. and 150° C., preferably between 10° C. and 70° C. The reaction pressure is generally in the range 3–80 bar, preferably 4–20 bar.

The amount of the radical usable initiator is the standard one for the copolymerization of fluorinated olefinic monomers, and is generally in the range 0.003%–10% by weight with respect to the total amount of (co)polymerized monomers.

The control of the molecular weight of the fluorinated polymers of the invention can be carried out in various ways.

Preferred are those by a suitable dosage of the radical initiator in polymerization and the selection of the synthesis temperature. To obtain the polymers of the invention having high molecular weight, i.e. having MFI lower than 15 g/10', a low synthesis temperature (10° C.–50° C.) combined with a low concentration of free radicals coming from the initiator is preferred. To obtain the invention polymers having low molecular weight, i.e. having a MFI higher than 5 g/10', a high synthesis temperature (60° C.–80° C.) combined with a high concentration of free radicals coming from the initiator, is preferred.

Another way to control the molecular weight is the use of chain transfer agents, these can be halogenated hydrocarbons, for example chloroform or HCFC 123 and ethane or methane. The transfer agent is fed to the reactor at the beginning of the reaction, or in a continuous way or in discrete amounts during the polymerization. The used chain transfer agent amount can range within rather wide limits, depending on the reaction temperature and the molecular weight target. Generally, such amount ranges from 0.001 to 5% by weight, preferably from 0.05 to 1% by weight, with respect to the total amount of monomers fed to the reactor.

In the process according to the present invention the presence of liquid CTFE in the reaction medium, in order to obtain high productivity ($R_p$) in g/(lxh), is preferred.

A further object of the present invention are chlorotrifluoroethylene (PCTFE) (co)polymers, obtainable by the above described process, containing at least 80% by moles of CTFE, being the complement to 100 one or more fluorinated monomers, preferably the complement to 100 being one or more perfluorinated monomers.

The chlorotrifluoroethylene (PCTFE) (co)polymers of the invention are characterized in that the CTFE homopolymer, having a MFI of about 25 g/10', does not show discoloration, as defined below, and a global very reduced weight loss by thermogravimetric analysis.

The preferable (co)polymers of the invention are thermoplastic ones.

The CTFE homopolymers with MFI of about 25 g/10', obtained according to the present invention, have a weight loss which is approximately the half of the weight loss of the CTFE homopolymers obtained in emulsion.

Besides the efficiency confirmation of the process object of the present invention is mainly given by the high productivity yield and by the absence of polymer buildup in autoclave.

This low weight loss of the polymers of the invention combined with absence of discoloration allows to obtain manufactured articles of complex shape and with substantial absence of defects, mainly bubbles. For example, the presence of bubbles in the extruded film makes it unusable, since the main PCTFE characteristic is the impermeability.

Among the fluorinated monomers, we can mention hexafluoropropylene, hexafluoroisobutylene, vinilydenfluoride, tetrafluoroethylene, fluorinated ethers such as perfluoroalkylvinylethers, for example perfluoroethylvinylether, perfluoromethylvinylether, preferably perfluoropropylvinyl-ether, or mixtures thereof, The viscosity of CTFE (co)polymers according to the present invention is defined by the Melt Flow Index measure (MFI) at 265° C. and 10 Kg load according to the ASTM D 1238-88 method.

The discoloration is determined through the observation of the strands obtained after 20, 40 and 60 minutes of residence time of the polymer in the MFI machine at 265° C. Discoloration means the coloration of the extruded polymer. The product not showing discoloration is colourless or white. Polymers showing discoloration are generally yellowish or brown. The skilled in the art is able to determine whether the polymer shows or not discoloration also by using methods measuring the colour index such as for example white index or yellow index.

The thermal stability is subsequently controlled, if there is substantially no discoloration as above defined, through thermo-gravimetric measures (TGA) carried out as follows:

i) Dynamic TGA with a heating rate of 20° C./minute up to 300° C.;

ii) Isotherm TGA at 300° C. for 60 minutes.

The global variations by weight ($\Delta W$, % by weight) and the weight loss rate in the last 10 minutes of the isothermal treatment ($\Delta W/\Delta t$, % by weight/h) are determined (see Table 1).

The perfluoropropylvinylether content in the PCTFE copolymers has been determined by $^{19}F$-NMR.

The second melting temperature ($T_{2f}$) and the crystallization temperature ($T_{xx}$) are determined by differential scanning calorimetry (DSC).

The following Examples are given for illustrative purposes and are not limitative of the present invention.

EXAMPLE 1

A 2 l AISI 316 autoclave, equipped with stirrer working at 400 rpm, has been evacuated and therein were introduced in sequence:

1300 g of demineralized $H_2O$;

14 g of a microemulsion formed of: 20% by weight of Galden® D02, having formula:

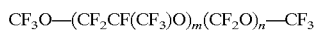

having m/n=20 and average molecular weight of 450; 40% by weight of a surfactant having formula:

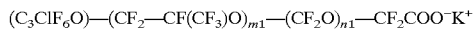

having m1/n1=82.7 and average molecular weight of 527; the remaining part being formed of $H_2O$.

In the autoclave 400 g of CTFE were then introduced between 1° C. and 5° C. Then the autoclave was heated to the reaction temperature of 60° C. and 3.0 g of potassium persulphate dissolved in 90 g of demineralized $H_2O$ were then introduced.

After 240 minutes of reaction, when the working pressure has decreased of 50% with respect to its initial value, the autoclave is vented and discharged at room temperature.

The latex discharged from the autoclave, having a concentration of 250.0 g/l of water, was cryogenically coagulated, then the polymer was separated and dried at 175° C. for about 16 hours.

After the latex was discharged and the autoclave washed with water, its internal walls did not show residues.

No discoloration of the strands obtained after 60 minutes of residence time in the MFI machine at 265° C., was noticed.

The test result of the thermal stability of the obtained polymer is shown in Table 1. As a further proof of the thermal stability no discoloration of the strands obtained after 80 minutes of residence time in the MFI machine at 280° C., was noticed.

EXAMPLE 2 COMPARATIVE (COMP)

A 2 l AISI 316 autoclave, equipped with stirrer working at 400 rpm, has ben evacuated and therein were introduced in sequence:

1200 g of demineralized $H_2O$;

a solution of 5.6 g of sodium perfluorooctanoate (PFONa) in 100 g of water, corresponding to the surfactant amount fed in Example 1.

In the autoclave 400 g of CTFE were then introduced between 1° C. and 5° C. Then the autoclave was heated to the reaction temperature of 60° C. and 3.0 g of potassium persulphate dissolved in 90 g of demineralized $H_2O$ were then introduced.

After 705 minutes of reaction, when the working pressure has decreased of 50% with respect to its initial value, the autoclave is vented and discharged at room temperature.

The latex discharged from the autoclave, having a concentration of 239.0 g/l of water, was cryogenically coagulated, then the polymer was separated and dried at 175° C. for about 16 hours.

After having discharged the latex and washed with water the autoclave, its internal walls show some residues.

No discoloration of the strands obtained after 60 minutes of residence time in the MFI machine at 265° C., was noticed.

EXAMPLE 3 COMPARATIVE (COMP)

A 2 l AISI 316 autoclave, equipped with stirrer working at 400 rpm, has been evacuated and therein were introduced in sequence:

1300 g of demineralized $H_2O$;

18.3 g of a microemulsion formed of: 18.37% by weight of Galden® D02, having formula:

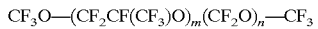

having m/n=20 and average molecular weight of 450; 30.61% by weight of a surfactant having formula:

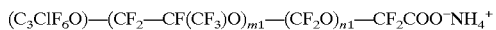

having m1/n1=82.7 and average molecular weight of 527, corresponding to the surfactant amount introduced in Example 1; the remaining part being formed of $H_2O$.

In the autoclave 400 g of CTFE were then introduced between 1° C. and 5° C. Then the autoclave was heated to the reaction temperature of 60° C. and 2.5 g of ammonium persulphate, equivalent by moles to the potassium persulphate of Example 1, dissolved in 90 g of demineralized $H_2O$ were then introduced.

After 195 minutes of reaction, when the working pressure has decreased of 50% with respect to its initial value, the autoclave is vented and discharged at room temperature.

The latex discharged from the autoclave, having a concentration of 259.0 g/l of water, was cryogenically coagulated, then the polymer was separated and dried at 175° C. for about 16 hours.

After the latex was discharged, part of this is present in the form of coagulum on the bottom of the autoclave.

Discoloration of the obtained strands was noticed already after 20 minutes of residence time in the MFI machine at 265° C.

EXAMPLE 4 COMPARATIVE (COMP)

The comparative Example 3 was repeated, replacing the ammonium persulphate with 3.0 g of potassium persulphate.

After 245 minutes of reaction, when the working pressure has decreased of 50% with respect to its initial value, the autoclave is vented and discharged at room temperature.

The latex discharged from the autoclave, having a concentration of 260 g/l of water, was cryogenically coagulated, then the polymer was separated and dried at 175° C. for about 16 hours.

After the latex was discharged and the autoclave washed with water, its internal walls did not show residues.

Discoloration of the obtained strands was noticed already after 20 minutes of residence time, in the MFI machine at 265° C.

EXAMPLE 5 COMPARATIVE (COMP)

Example 1 was repeated, replacing the potassium persulphate with an equivalent amount by moles of ammonium persulphate: 2.5 g.

After 272 minutes of reaction, when the working pressure has decreased of 50% with respect to its initial value, the autoclave is vented and discharged at room temperature.

The latex discharged from the autoclave, having a concentration of 275 g/l water, was cryogenically coagulated, then the polymer was separated and dried at 175° C. for about 16 hours.

After the latex was discharged and the autoclave washed with water, its internal walls did not show residues.

Discoloration of the obtained strands was noticed already after 20 minutes of residence time in the MFI machine at 265° C.

EXAMPLE 6

A 2 l AISI 316 autoclave, equipped with stirrer working at 400 rpm, has been evacuated and therein were introduced in sequence:

1200 g of demineralized $H_2O$;

14 g of a microemulsion formed of: 20% by weight of Galden® D02, having formula:

$$CF_3O-(CF_2CF(CF_3)O)_m(CF_2O)_n-CF_3$$

having m/n=20 and average molecular weight of 450; 40% by weight of a surfactant having formula:

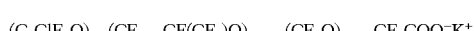

$$(C_3ClF_6O)-(CF_2-CF(CF_3)O)_{m1}-(CF_2O)_{n1}-CF_2COO^-K^+$$

having m1/n1=82.7 and average molecular weight of 527; the remaining part being formed of $H_2O$ 3.0 g of potassium persulphate dissolved in 200 g of demineralized $H_2O$.

In the autoclave 33 g of perfluoropropylvinylether (FPVE) and 400 g of CTFE were then introduced between 1° C. and 5° C.

Then the autoclave was heated to reaction temperature of 50° C.

After 500 minutes of reaction, when the working pressure has decreased of 50% with respect to its initial value, the autoclave is vented and discharged at room temperature.

The latex discharged from the autoclave, having a concentration of 268 g/l of water, was cryogenically coagulated, then the polymer was separated and dried at 175° C. for about 16 hours.

The perfluoropropylvinylether content in the obtained copolymer is 1.5% by moles.

After the latex was discharged and the autoclave was washed with water, its internal walls did not show residues.

No discoloration of the obtained strands was noticed after 60 minutes of residence time in the MFI machine at 265° C.

EXAMPLE 7 COMPARATIVE

A 2 l AISI 316 autoclave, equipped with stirrer working at 400 rpm, has been evacuated and therein were introduced in sequence:

1200 g of demineralized $H_2O$;

a solution of 5.6 g of sodium perfluorooctanoate (PFONa) in 100 g of water, corresponding to the surfactant amount introduced in Example 1.

3.0 g of potassium persulphate dissolved in 200 g of demineralized $H_2O$.

In the autoclave 33 g of perfluoropropylvinylether (FPVE) and 400 g of CTFE were then introduced between 1° C. and 5° C. Then the autoclave was heated to the reaction temperature of 50° C.

After 1890 minutes of reaction, when the working pressure has decreased of 50% with respect to its initial value, the autoclave is vented and discharged at room temperature.

The latex discharged from the autoclave, having a concentration of 239 g/l in water, was cryogenically coagulated, then the polymer was separated and dried at 175° C. for about 16 hours.

After the latex was discharged and the autoclave washed with water, its internal walls are completely covered by a layer of the obtained polymer.

Discoloration of the obtained strands was noticed after 60 minutes of residence time in the MFI machine at 265° C.

TABLE 1

| EXAMPLE | 1 | 2 (comp) | 6 | 7 (comp) |
| --- | --- | --- | --- | --- |
| $T_{2f}$ (° C.) | 212.2 | 211.4 | 197.1 | — |
| $T_{xx}$ (° C.) | 181.7 | 175.5 | 162.0 | — |
| $R_p$ (g/(1 × h)) | 62.5 | 20.3 | 32.2 | 7.6 |
| MFI (g/10') | 25.0 | 24.6 | 9.8 | 4.9 |
| $\Delta W$ (% w) | 0.34 | 0.81 | — | — |
| $\Delta W/\Delta t$ (% w/h) | 0.126 | 0.312 | — | — |
| DISCOLORATION | NO | NO | NO | YES |

What is claimed is:

1. A process for the synthesis of chlorotrifluoroethylene (PCTFE) (co)polymers, containing at least 80% by moles of CTFE, the complement to 100 being one or more fluorinated monomers in aqueous emulsion, in the presence of a microemulsion consisting of water, (per)fluoropolyoxyalkylenes, and fluorinated surfactant, and an inorganic initiator, wherein the fluorinated surfactant has formula:

$$R_f-X^-M^+$$

wherein $R_f$ is a $C_5$–$C_{14}$ (per)fluoroalkyl chain, or a (per) fluoropolyoxyalkylene chain, $X^-$ is $-COO^-$ or $-SO_3^-$, $M^+$ is Na$^+$ or K$^+$, and the initiator is a potassium and/or sodium persulphate, wherein temperature is in the range of 0° C.–150° C. and pressure is in the range of 3–80 bar.

2. A process according to claim 1, wherein M$^+$ is K$^+$.

3. A process according to claim 1, wherein the temperature ranges between 10° C. and 70° C. and the pressure between 4 and 20 bar.

4. A process according to claim 1, wherein the CTFE is liquid.

5. A process according to claim 1, wherein the fluorinated monomers are perfluorinated.

* * * * *